No. 611,575. Patented Sept. 27, 1898.
T. McE. GILL.
TOBACCO PIPE.
(Application filed Dec. 20, 1897.)

(No Model.)

WITNESSES:
M. S. Blondel
P. B. Turpin

INVENTOR
Thomas McE. Gill.
BY Munn & Co.
ATTORNEYS.

United States Patent Office.

THOMAS McE. GILL, OF MEXICO, MISSOURI.

TOBACCO-PIPE.

SPECIFICATION forming part of Letters Patent No. 611,575, dated September 27, 1898.

Application filed December 20, 1897. Serial No. 662,598. (No model.)

*To all whom it may concern:*

Be it known that I, THOMAS MCELDERRY GILL, residing in Mexico, in the county of Audrain and State of Missouri, have invented a new and useful Improvement in Tobacco-Pipes, of which the following is a specification.

My invention is an improvement in pipes for smoking-tobacco and the like, and has for an object to provide a pipe having a bowl or lining and a casing of a special construction, whereby to provide a pipe in which all the advantages of an ordinary wood or a cob pipe may be secured, together with additional advantages, and to provide a pipe which will present at all times a good appearance and will be desirable in many ways.

The invention consists in certain novel constructions and combinations of parts, as will be hereinafter described, and pointed out in the claims.

Figure 1:
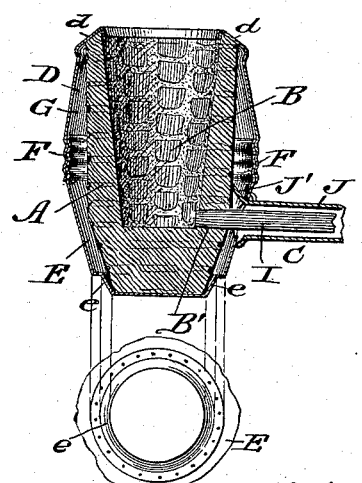
Figure 2:
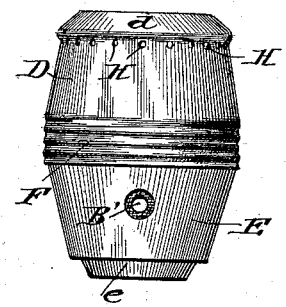
Figure 3:
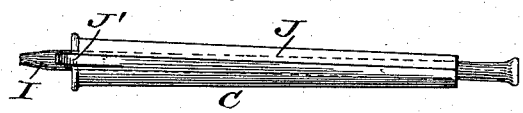
Figure 4:
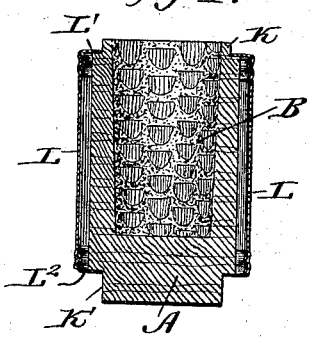
Figure 5:
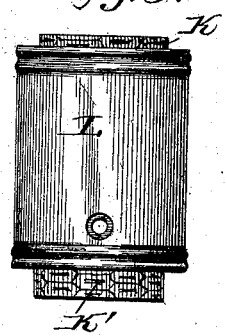

In the drawings, Figure 1 is a sectional view, and Fig. 2 a side view, of a pipe embodying my improvements. Fig. 3 illustrates the stem in detail; and Figs. 4 and 5 show somewhat different constructions, as will be presently described.

By my invention I seek to do away with the varnish and filling or other polished finish commonly used on cob and wood pipes, which are largely destructive of the desirable qualities of such pipes, and to secure a fine external finish and shape which will permit the thorough cleaning and ready renewal of the bowl or linings of the pipe and will at the same time form an air-chamber surrounding the lining to prevent the exterior of the pipe from being overheated and will permit the convenient adjustment of the casing to take up shrinkage from time to time, as may be desired. I also secure such results by a special construction of casing, which serves to form an ornamental exterior, strengthens the casing so the lightest and cheapest material may be used, and operates to maintain the relative position of the linings and casing in a simple and complete way without coöperative means.

In the construction shown in Fig. 1 the bowl A has a suitable tobacco-cavity B, an opening B' for the connection of the stem C, and is preferably tapered at its lower end. This bowl or lining may be of wood, cob, or other suitable material and may be formed in any suitable shape desired.

The casing shown in Fig. 1 is composed of the mouth-section D and the base-section E, which are threaded together at F, and the base-section E is countersunk at *e* to receive the tapered lower end of the pipe-bowl. The section D has an opening which surrounds the mouth of the bowl-cavity and is provided with a beveled flange *d*, which partly overlaps the open end of the bowl. The casing so formed provides an air-space G, surrounding the bowl or lining, which prevents the exterior of the pipe from becoming overheated. Suitable air-openings H may be provided leading into the space G, and these openings H may be arranged as shown or in other suitable manner.

The screw-threads at F permit the ready adjustment of the casing to tighten the same on the lining, form an ornamental finish, and strengthen the casing, and will at the same time permit the ready renewal of the bowl when desired.

The lower or base section may be raised or lowered to suitably adjust the stem-hole by placing a thin wafer or the like between the bottom and bowl or by cutting a small portion off the bottom of the bowl, the upper section readily adjusting itself, so that shrinkage is easily overcome.

The dropped or countersunk portion *e* serves to give the pipe a better appearance, as well as to maintain the lining or bowl in place.

The stem is formed, as shown, with an ordinary cane lining or tube I and with a metallic casing J, which encircles the stem preferably in such manner as to provide an air-space surrounding the tube I. At its end which joins with the pipe-bowl the casing J is suitably finished, and this casing is made tubular and tapering in a suitable forming-machine, but need not be brazed or fastened, as it is not necessary for it to be air-tight. In practice the casing is slightly tempered and made smaller at its outer end than the ordinary run of cane-stems, so it will operate as a spring to secure the stem. Where it is desired to hold the end of the casing J to the bowl-casing, this may be done by cutting a small spring J' at the end of the casing J and extending it to form an inclined tongue, which will catch on the inside of the bowl-casing and adjust itself to secure the bowl-casing and stem-casing together.

In Figs. 4 and 5 the bowl or lining is provided at its ends with tenon portions K K', and the casing is formed in three parts L, L', and L², threaded together, as clearly shown in said Figs. 4 and 5. It is manifest that this and similar constructions will be within the broad principles of my invention.

The casings may be of any suitable thin sheet metal, it being desirable to make varieties in appearance, and the stem-casing will have the spring quality before described. In finishing the casings this may be accomplished by blue japanning or other colors, by plating, papering, or by what is known among steel-workers as "bluing."

The casings may be made seamless by the stamping process.

It will be noticed that by constructing the casing in sections to interlock, as shown and described, the linings may be readily renewed when desired.

In practice any desired lettering or design may be raised or otherwise produced upon the casing.

Where desired, the casing may be of a non-conducting material, such as sheet-zinc, in which case the air-chamber might be reduced to a minimum just sufficient to admit air, the inequalities in the surface of the linings being sufficient to separate the parts, suitable openings or perforations being provided in the bottom of the lower cap and in the upper one also.

It will be understood that when desired the casing may be made of paper or preparations thereof.

The threads may be extended on either section to any degree desired.

Having thus described my invention, what I claim, and desire to secure by Letters Patent, is—

1. A pipe composed of the bowl and the casing formed in sections inclosing the bowl, having their inner meeting ends adjustably interlocked whereby their outer ends may be set toward and from each other and having at such outer ends portions engaging the bowl whereby the same may be clamped between the end portions of the casing-sections substantially as set forth.

2. A bowl-casing for pipes consisting of sections corrugated forming threads connecting at their meeting ends whereby they are detachably and adjustably connected and whereby the casing is strengthened, substantially as shown and described.

3. A pipe comprising the bowl or body, the casing therefor, the stem-tube, and the stem-casing binding the stem and having a tongue engaging the bowl-casing substantially as shown and described.

4. In a pipe, a bowl-casing combined with a stem-casing having a spring-tongue to engage the bowl-casing, substantially as described.

5. In a pipe, the combination of the bowl or lining having a stem-opening and the casing having a stem-opening registering with that of the bowl-opening and formed in sections adjustably interlocking with each other, substantially as described.

6. A pipe comprising the bowl or lining and the casing therefor formed in sections meeting at their ends midway between the ends of the bowl and having such ends threaded together, substantially as described.

7. The pipe herein described consisting of the bowl or lining, the stem-tube, the bowl-casing formed in sections interlocking substantially as described and provided at their ends with portions engaging the ends of the bowl whereby to clamp the same, and the stem-casing of spring material arranged at its outer end to bind or grip the stem and provided at its inner end with a spring-tongue to engage the bowl-casing, substantially as described.

THOMAS McE. GILL.

Witnesses:
W. H. WALLACE,
B. F. TOMLINSON.